United States Patent
Burns

(10) Patent No.: US 9,591,432 B2
(45) Date of Patent: Mar. 7, 2017

(54) VEHICLE ENTERTAINMENT UNIT AND METHOD OF CONTROLLING THE SAME

(71) Applicant: VOXX INTERNATIONAL CORPORATION, Hauppauge, NY (US)

(72) Inventor: Richard Paul Burns, Sterling Heights, MI (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 0 days.

(21) Appl. No.: 14/588,561

(22) Filed: Jan. 2, 2015

(65) Prior Publication Data

US 2016/0198288 A1 Jul. 7, 2016

(51) Int. Cl.
| | |
|---|---|
| H04M 1/725 | (2006.01) |
| H04W 4/00 | (2009.01) |
| H04L 29/08 | (2006.01) |
| H04N 21/414 | (2011.01) |
| H04W 76/02 | (2009.01) |
| H04N 21/4363 | (2011.01) |
| H04N 21/6336 | (2011.01) |
| H04W 84/18 | (2009.01) |

(52) U.S. Cl.
CPC .............. *H04W 4/008* (2013.01); *H04L 67/12* (2013.01); *H04N 21/41422* (2013.01); *H04N 21/43637* (2013.01); *H04N 21/6336* (2013.01); *H04W 76/023* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2002/0068626 A1* | 6/2002 | Takeda et al. | 463/30 |
| 2006/0173583 A1* | 8/2006 | Wong | 701/1 |
| 2007/0015485 A1* | 1/2007 | DeBiasio et al. | 455/345 |
| 2007/0135087 A1* | 6/2007 | Villevieille et al. | 455/403 |
| 2007/0142024 A1* | 6/2007 | Clayton et al. | 455/403 |
| 2010/0211708 A1* | 8/2010 | Rohaly et al. | 710/63 |
| 2011/0110530 A1* | 5/2011 | Kimura | 381/86 |
| 2012/0196583 A1* | 8/2012 | Kindo | 455/415 |

(Continued)

OTHER PUBLICATIONS

Written Opinion of US PCT International Application Serial No. PCT/US2015/068236.

*Primary Examiner* — David Bilodeau
(74) *Attorney, Agent, or Firm* — F. Chau & Associates, LLC

(57) ABSTRACT

A method of controlling a vehicle entertainment unit mounted in a vehicle using a center stack control system of the vehicle includes establishing a BLUETOOTH connection between the center stack control system and the vehicle entertainment unit, retrieving metadata from the vehicle entertainment unit, transmitting the metadata from the vehicle entertainment unit to the center stack control system via the BLUETOOTH connection, receiving a control command at the vehicle entertainment unit via the BLUETOOTH connection, mapping the control command to a corresponding function of the vehicle entertainment unit at the vehicle entertainment unit, and executing the corresponding function at the vehicle entertainment unit.

1 Claim, 5 Drawing Sheets

(56) References Cited

U.S. PATENT DOCUMENTS

| | | | |
|---|---|---|---|
| 2013/0073387 A1* | 3/2013 | Heath | G06Q 50/01 |
| | | | 705/14.53 |
| 2013/0288606 A1* | 10/2013 | Kirsch | 455/41.3 |
| 2013/0332844 A1* | 12/2013 | Rutledge | G06F 3/0484 |
| | | | 715/744 |
| 2014/0306814 A1* | 10/2014 | Ricci | H04W 48/04 |
| | | | 340/425.5 |
| 2016/0191584 A1* | 6/2016 | Dickow | H04L 65/4076 |
| | | | 709/219 |

* cited by examiner

VEHICLE ENTERTAINMENT UNIT AND METHOD OF CONTROLLING THE SAME

BACKGROUND

1. Technical Field

Exemplary embodiments of the present invention relate to a vehicle entertainment unit and a method of controlling the same.

2. Discussion of Related Art

Typically, when an aftermarket vehicle entertainment unit that was not pre-installed in a vehicle is subsequently added to the vehicle, the aftermarket vehicle entertainment unit cannot be controlled via the vehicle's existing center stack control system, since the aftermarket vehicle entertainment unit and the center stack control system are not able to communicate with each other. Thus, although the driver or a front seat passenger may wish to control an aftermarket vehicle entertainment unit installed in the rear of the vehicle, for example, in a situation in which a small child in the rear of the vehicle is viewing the unit, the driver or front seat passenger may be unable to do so.

Further, vehicles that have vehicle entertainment units pre-installed may require expensive custom and proprietary software to be pre-installed in the vehicle's center stack control system to allow the pre-installed vehicle entertainment unit to be controlled by the center stack control system. If the center stack control system or the pre-installed vehicle entertainment unit malfunctions, it may be expensive, difficult and/or impossible to replace the malfunctioning unit such that the center stack control system may continue to be used to control the pre-installed vehicle entertainment unit.

SUMMARY

According to an exemplary embodiment of the present invention, a method of controlling a vehicle entertainment unit mounted in a vehicle using a center stack control system of the vehicle includes establishing a BLUETOOTH connection between the center stack control system and the vehicle entertainment unit, retrieving metadata from the vehicle entertainment unit, transmitting the metadata from the vehicle entertainment unit to the center stack control system via the BLUETOOTH connection, and receiving a control command at the vehicle entertainment unit via the BLUETOOTH connection. The control command is issued by the center stack control system in response to a user interacting with visual content corresponding to the metadata at the center stack control system. The method further includes mapping the control command to a corresponding function of the vehicle entertainment unit at the vehicle entertainment unit, and executing the corresponding function at the vehicle entertainment unit.

In an exemplary embodiment, the corresponding function executed at the vehicle entertainment unit includes selecting a media source from among a plurality of media sources of the vehicle entertainment unit for playback at the vehicle entertainment unit. In an exemplary embodiment, the control command is mapped using an Audio/Video Remote Control Profile (AVRCP) BLUETOOTH profile.

In an exemplary embodiment, the AVRCP BLUETOOTH profile is version 1.4 or higher.

In an exemplary embodiment, the corresponding function executed at the vehicle entertainment unit includes controlling playback of media content playing at the vehicle entertainment unit.

In an exemplary embodiment, the vehicle entertainment unit is semi-permanently mounted in the vehicle.

In an exemplary embodiment, the vehicle entertainment unit is semi-permanently mounted in a seat in the vehicle.

In an exemplary embodiment, the vehicle entertainment unit is semi-permanently mounted in a headrest of the seat.

According to an exemplary embodiment of the present invention, a vehicle entertainment unit includes a BLUETOOTH transceiver configured to establish a BLUETOOTH connection between the vehicle entertainment unit and a center stack control system of a vehicle, and a processor. The processor is configured to retrieve metadata from the vehicle entertainment unit. The retrieved metadata is transmitted from the vehicle entertainment unit to the center stack control system by the BLUETOOTH transceiver via the BLUETOOTH connection. The BLUETOOTH transceiver is configured to receive a control command via the BLUETOOTH connection from the center stack control system in response to a user interacting with visual content corresponding to the metadata at the center stack control system. The processor is further configured to map the control command to a corresponding function of the vehicle entertainment unit, and execute the corresponding function at the vehicle entertainment unit. The vehicle entertainment unit is configured to be mounted in the vehicle.

In an exemplary embodiment, the vehicle entertainment unit further includes a plurality of media sources. The corresponding function executed at the vehicle entertainment unit includes selecting one of the plurality of media sources for playback at the vehicle entertainment unit.

In an exemplary embodiment, the plurality of media sources includes two different types of portable storage device interfaces.

In an exemplary embodiment, the two different types of portable storage device interfaces include a memory card slot and a USB interface.

In an exemplary embodiment, the plurality of media sources includes a memory card slot, a USB interface and an optical disc drive.

In an exemplary embodiment, the control command is mapped using an Audio/Video Remote Control Profile (AVRCP) BLUETOOTH profile.

In an exemplary embodiment, the AVRCP BLUETOOTH profile is version 1.4 or higher.

In an exemplary embodiment, the corresponding function executed at the vehicle entertainment unit includes controlling playback of media content playing at the vehicle entertainment unit.

In an exemplary embodiment, the vehicle entertainment unit is semi-permanently mounted in the vehicle.

In an exemplary embodiment, vehicle entertainment unit is semi-permanently mounted in a seat in the vehicle.

In an exemplary embodiment, the vehicle entertainment unit is semi-permanently mounted in a headrest of the seat.

According to an exemplary embodiment of the present invention, a vehicle entertainment unit includes a wireless transceiver configured to establish a wireless connection between the vehicle entertainment unit and a center stack control system of a vehicle, an optical disc drive configured to play first media content at the vehicle entertainment unit, a portable storage device interface configured to receive a portable storage device and play second media content at the vehicle entertainment unit, and a processor. The processor is configured to retrieve metadata from the vehicle entertainment unit. The retrieved metadata is transmitted from the vehicle entertainment unit to the center stack control system by the wireless transceiver via the wireless connection. The wireless transceiver is configured to receive a control command via the wireless connection from the center stack control system in response to a user interacting with visual content corresponding to the metadata at the center stack control system. The processor is further configured to map the control command to a corresponding function of the vehicle entertainment unit, and execute the corresponding function at the vehicle entertainment unit. The corresponding function executed at the vehicle entertainment unit includes selecting one of the first media content and the second media content for playback at the vehicle entertainment unit. The vehicle entertainment unit is configured to be mounted in the vehicle.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
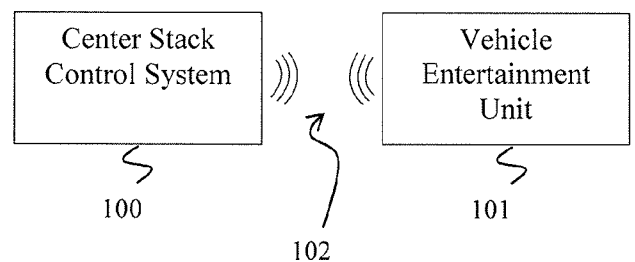
FIG. 1 shows an overview of a system in which a vehicle entertainment unit is controlled using a vehicle's center stack control system according to an exemplary embodiment of the present invention.

Exemplary embodiments of the present invention will be described more fully hereinafter with reference to the accompanying drawings. Like reference numerals may refer to like elements throughout the accompanying drawings.

Exemplary embodiments of the present invention provide a system and method of controlling a vehicle entertainment unit using a vehicle's existing center stack control system. For example, exemplary embodiments of the present invention provide a vehicle entertainment unit that may be disposed anywhere in a vehicle and controlled via the vehicle's center stack control system. Herein, the term center stack control system refers to the primary control system disposed within the vehicle. The center stack control system is typically pre-installed in a vehicle by the vehicle manufacturer. Input controls of the center stack control system are typically disposed at the front of the vehicle near the driver's seat to provide the driver with the ability to control various systems in the vehicle including, for example, audio/radio systems, heating/cooling systems, navigation systems, seat adjustment systems, mirror adjustment systems, etc. The center stack control system may be controlled by the driver via a variety of inputs located, for example, in the center console in the dashboard of the vehicle (e.g., via the vehicle's pre-existing radio unit), on the steering wheel, or at other locations within the vehicle. The center stack control system is semi-permanently mounted in the vehicle, and may also be referred to herein as a stock vehicle head unit or a stock vehicle receiver unit.

Herein, the term vehicle entertainment unit refers to an entertainment unit disposed within the vehicle that includes a display screen for presenting video content to a user. The vehicle entertainment unit may further include, for example, a speaker for providing audio content, and/or a wireless transceiver(s) (e.g., a BLUETOOTH transceiver, a Wi-Fi transceiver, a cellular transceiver, etc.) that wirelessly provides audio content to, for example, wireless headphones worn by a user, and/or receives media content wirelessly from a remote source to be provided to the user. The vehicle entertainment unit may include a variety of media sources and interfaces allowing for media to be input to the vehicle entertainment unit including, for example, an optical disc player (e.g., a DVD and/or CD-ROM player), a portable storage device interface(s) (e.g., a memory card slot such as an SD card slot, a microSD card slot, etc., a USB interface, a microUSB interface, an APPLE LIGHTNING interface, etc.), an HDMI interface, an interface for connecting to an additional monitor in the vehicle that is separate from the vehicle entertainment unit, etc.

Figure 7A:
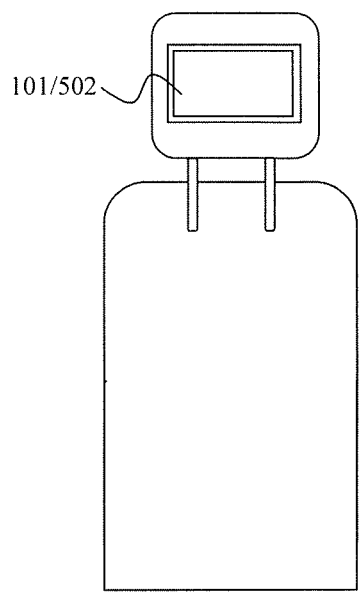
FIGS. 7A and 7B show a vehicle entertainment unit mounted in various locations in a vehicle according to exemplary embodiments of the present invention.
Figure 7B:
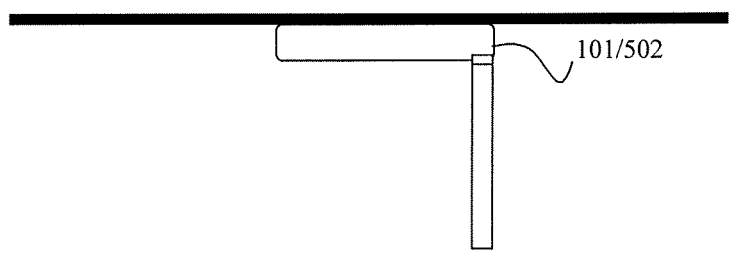

The vehicle entertainment unit may be mounted within the vehicle at a variety of locations. For example, the vehicle entertainment unit may be a rear seat vehicle entertainment unit mounted, for example, within a seat in the vehicle (e.g., within a headrest of a seat in the vehicle or within the seatback of a seat in the vehicle) (see FIG. 7A). The vehicle entertainment unit may also be positioned overhead in the vehicle (see FIG. 7B), mounted in the dashboard of the vehicle, or in any other convenient location of the vehicle. The vehicle entertainment unit is fixedly mounted at any of these locations, such that vehicle entertainment unit is semi-permanently/non-removably mounted within the vehicle. Herein, the term semi-permanently/non-removably mounted refers to a unit not being detachably mounted in the vehicle. For example, although the semi-permanently/non-removably mounted vehicle receiver unit may be removed from the vehicle with the proper tools, the unit is not typically mounted in the vehicle via quick release latches, buttons, docking stations, quick release mounts, etc., and thus, may not be quickly and conveniently removed from the vehicle by a user.

Exemplary embodiments of the present invention allow for a vehicle entertainment unit mounted in a vehicle to be controlled using the vehicle's center stack control system. The vehicle entertainment unit may be pre-installed in a new vehicle or may be an aftermarket vehicle entertainment unit subsequently added to a vehicle. The ability of the center stack control system to communicate with and control the vehicle entertainment unit may be implemented using, for example, a wireless connection such as a BLUETOOTH connection in combination with certain BLUETOOTH profiles (e.g., the Audio/Video Remote Control Profile (AVRCP)).

Exemplary embodiments described herein are not limited to being utilized in any particular make or model vehicle.

FIG. 1 shows an overview of a system in which a vehicle entertainment unit is controlled using a vehicle's center stack control system according to an exemplary embodiment of the present invention.

As shown in FIG. 1, a vehicle's center stack control system 100 connects to a vehicle entertainment unit 101 via a wireless connection 102 (e.g., via a BLUETOOTH connection). Once the center stack control system 100 is connected to the vehicle entertainment unit 101, the center stack control system 100 may control functionality of the vehicle entertainment unit 101, as described in further detail below.

Figure 2:
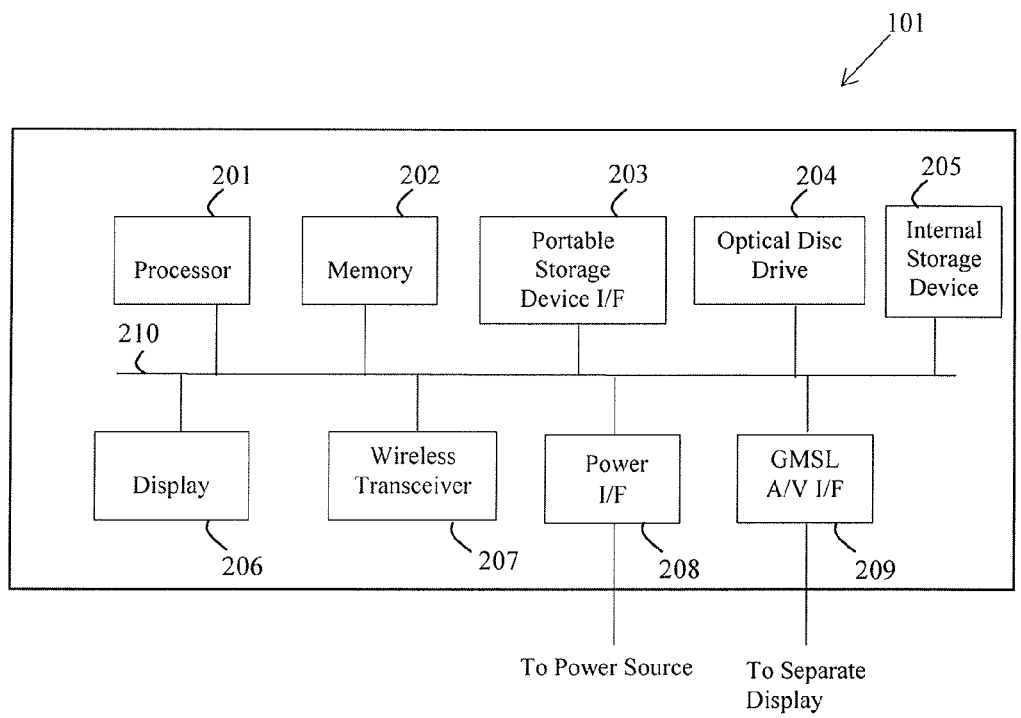
FIG. 2 is a block diagram showing a vehicle entertainment unit according to an exemplary embodiment of the present invention.

FIG. 2 is a block diagram showing a vehicle entertainment unit according to an exemplary embodiment of the present invention.

The vehicle entertainment unit 101 may include, for example, a processor 201, a memory 202, a portable storage device interface(s) 203, an optical disc drive 204 (e.g., a DVD/CD-ROM player), an internal storage device 205, a display 206 (e.g., an LCD display), a wireless transceiver(s) 207 (e.g., a BLUETOOTH transceiver, WiFi transceiver, and/or cellular transceiver), a power connection interface 208 (e.g., a 12V connection port to receive power from the vehicle), and a gigabit multimedia serial link (GMSL) audio/video (A/V) interface 209 (e.g., to connect to a second display separate from the vehicle entertainment unit 101). The components of the vehicle entertainment unit 101 communicate with each other via a bus(es) 210. It is to be understood that the vehicle entertainment unit 101 may include some or all of the components described with reference to FIG. 2, and may further include additional components.

The processor 201, memory 202 and internal storage device 205 are utilized to implement a mapping program designed to facilitate communication between the center stack control system 100 and the vehicle entertainment unit 101 to allow the center stack control system 100 to control the vehicle entertainment unit 101, as described below.

The portable storage device interface 203 may be, for example, a memory card slot (e.g., an SD card slot or a microSD card slot) a USB interface, a microUSB interface, an APPLE LIGHTNING interface, etc., and may be used to receive media input from a corresponding media device. The vehicle entertainment unit 101 may include a plurality of portable storage device interfaces 203 corresponding to the different types of portable storage devices described herein.

The power interface 208 is utilized to supply the vehicle entertainment unit 101 with power. The power interface 205 may be, for example, a 12V connection port configured to receive power from the vehicle. According to exemplary embodiments, a wire connecting the power interface 208 to the vehicle's power source is the only external wire of the vehicle entertainment unit 101.

The wireless transceiver 207 is configured to establish a wireless connection between the center stack control system 100 and the vehicle entertainment unit 101. For example, the center stack control system 100 included in many vehicles today includes support for BLUETOOTH wireless communication via, for example, a BLUETOOTH transceiver disposed in the center stack control system 100. This BLUETOOTH support may be utilized to connect the center stack control system 100 to the vehicle entertainment unit 101. Once connected, the center stack control system 100 may be used to control functionality of the vehicle entertainment unit 101 via the wireless (e.g., BLUETOOTH) connection 102 using, for example, AVRCP, as described in further detail below. Additional wireless transceiver(s) 207 may further be included. For example, a Wi-Fi wireless transceiver 207 may be included to allow the vehicle entertainment unit 101 to connect to another device such as, for example, a wireless media source, via a Wi-Fi or Wi-Fi DIRECT connection. Further, a cellular wireless transceiver 207 may be included to allow the vehicle entertainment unit 101 to receive media content from a remote media source connected to the vehicle entertainment unit 101 via a cellular connection. In addition to receiving media content via these transceivers 207, data may also be transmitted via these additional transceivers 207 in exemplary embodiments.

Herein, when units according to exemplary embodiments of the present invention are described as utilizing AVRCP, it is assumed that the units are utilizing at least AVRCP version 1.4. That is, it is assumed that the center stack control system 100, the vehicle entertainment unit 101, and the wireless conversion control unit 501 (see FIG. 5) support AVRCP version 1.4 or higher. Notwithstanding the above, other versions of AVRCP may also be utilized, however, use of certain older versions may provide limited control functionality to the user. For example, use of certain older versions of AVRCP may not allow the user to implement certain extended functionality (e.g., certain extended browsing functionality) of the vehicle entertainment unit 101 using the center stack control system 100, or may provide limited control of the vehicle entertainment unit 101 using the center stack control system 100 compared to when AVRCP 1.4 or higher is used. Thus, it is to be understood that although exemplary embodiments may be described herein as utilizing AVRCP 1.4 (or higher), certain exemplary embodiments may also utilize previous versions of AVRCP.

Utilization of the vehicle entertainment unit 101 with a center stack control system 100 that supports AVRCP 1.4 provides for a control implementation having extended functionality. For example, the user may implement a variety of control functions to control the vehicle entertainment unit 101 via the center stack control system 100 when AVRCP 1.4 is supported. Exemplary embodiments may also be utilized with a vehicle having a center stack control system 100 that does not support AVRCP 1.4, however such an implementation provides a more limited level of functionality for the user, as described above.

Referring to the AVRCP standardized Bluetooth profile, AVRCP provides a standard interface to control one device from another device via a BLUETOOTH connection. Using AVRCP 1.4, a user may use one device to control a variety of functions of another device including, for example, browsing and searching for content, and controlling other functions (e.g., playback functions) of the device.

Figure 3:
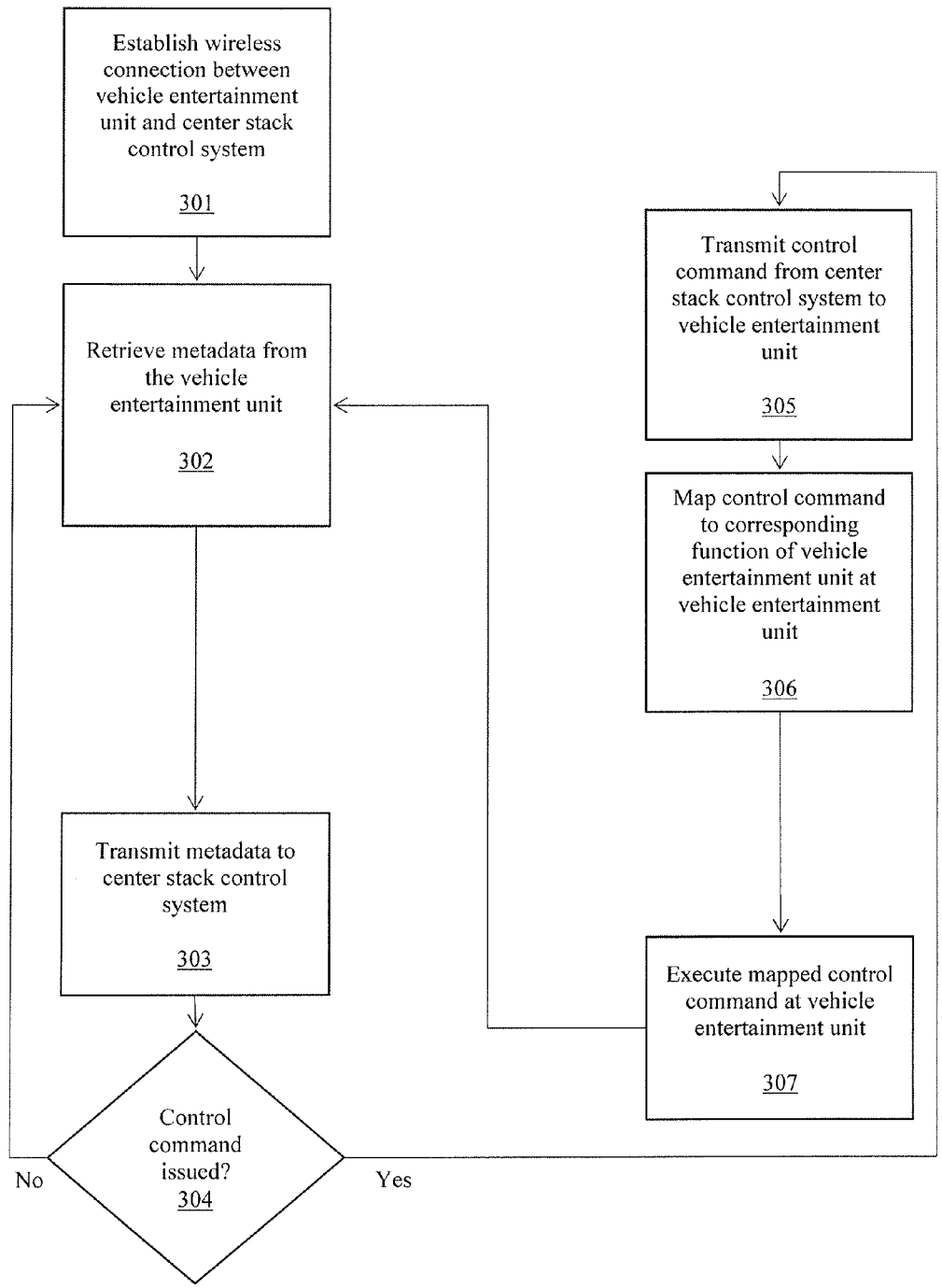
FIG. 3 is a flowchart showing a method of controlling a vehicle entertainment unit using a vehicle's center stack control system according to an exemplary embodiment of the present invention.

FIG. 3 is a flowchart showing a method of controlling a vehicle entertainment unit using a vehicle's center stack control system according to an exemplary embodiment of the present invention.

Referring to FIG. 3, a wireless (e.g., BLUETOOTH) connection (e.g., connection 102) is established between the vehicle entertainment unit 101 and the center stack control system 100 at block 301.

At block 302, metadata is retrieved from the vehicle entertainment unit 101 via the established wireless connection. The metadata indicates the different types of media sources that are available at the vehicle entertainment unit 101. For example, the metadata indicates the types of media sources included in and/or connected to the vehicle entertainment unit 101. For example, the retrieved metadata indicates to the center stack control system 100 whether the vehicle entertainment unit 101 has an optical disc drive 204, a portable storage device interface 203, etc. The metadata further indicates whether any of the media sources of the vehicle entertainment unit 101 are currently active. A media source is considered to be active when media is currently available at that media source. For example, a memory card slot is active when a memory card having media data is inserted into the slot, a USB interface is active when a USB device having media data is connected to the USB interface, a DVD player is active when a DVD having media data is inserted into the DVD drive, etc.

In addition to indicating which media sources are currently available at the vehicle entertainment unit 101, the metadata may further indicate the type of media data currently available at each media source (e.g., video data, image data, audio data, etc.). Metadata may include, for example, visual content (e.g., text) relating to the corresponding media in the active media source(s) at the vehicle entertainment unit 101. This visual content may be displayed at the center stack control system 100 (e.g., via a display of the center stack control system 100), and subsequently manipulated and acted upon by the user. Examples of visual content include a listing of media content at the media source (e.g., video and/or audio files such as movies, TV shows, music, etc.), and corresponding information relating to the listed media content (e.g., movie chapter information, song information such as title, artist, and album information, etc.).

At block 303, the retrieved metadata is transmitted from the vehicle entertainment unit 101 to the center stack control system 100 via the established wireless connection (e.g., by the processor 201 via the BLUETOOTH transceiver 207), where the visual content corresponding to the metadata may be displayed and acted upon by a user. The user may manipulate this visual content by issuing control commands at the center stack control system 100.

At block 304, it is determined whether a control command has been issued by the center stack control system 100. A control command is issued in response to the user interacting with the visual content corresponding to the metadata at the center stack control system 100. In an exemplary embodiment, control commands are standard AVRCP commands. The user may interact with the center stack control system 100 by interacting with an input control(s) of the center stack control system 100 such as, for example, a button, knob, touchscreen interface, remote control, etc. of the center stack control system 100, including, for example, input controls disposed on the steering wheel, in the dashboard, etc. A control command may, for example, cause at least one of a variety of functions relating to media control to be performed at the vehicle entertainment unit 101. For example, a browse control command allows the user to browse through media content on the vehicle entertainment unit 101 (e.g., traverse through a listing of media content). A switch media source/switch input command allows the user to switch between the different media sources included in and/or connected to the vehicle entertainment unit 101. Play, pause, rewind, fast forward, slow motion, previous track, next track, interval skip back and interval skip forward commands allows the user to manipulate playback of the media content such as movies, TV shows, songs, etc. It is to be understood that the control commands described herein are exemplary, and the center stack control system 100 may be used to issue additional control commands to the vehicle entertainment unit 101 (e.g., search commands, information request commands (e.g., to display additional information relating to a selected media file), diagnostic commands (e.g., to display diagnostic and system information relating to the vehicle entertainment unit 101), etc.

If a control command is not issued at block 304, metadata is again retrieved from the vehicle entertainment unit 101 at block 302, and this process continues until a control command is issued. Once a control command is issued at block 304, the control command is transmitted from the center stack control system 100 to the vehicle entertainment unit 101 via the established wireless connection at block 305. Once received by the vehicle entertainment unit 101, the control command is mapped to a corresponding function of the vehicle entertainment unit at the vehicle entertainment unit 101 at block 306, as described in further detail below with reference to FIG. 4. The corresponding function may be, for example, a media source selection function that selects/changes a media source of the vehicle entertainment unit 101 or a playback function (e.g., a play, pause, rewind, fast forward, slow motion, previous track, next track, interval skip back, or interval skip forward function) that manipulates playback of media that is playing on the vehicle entertainment unit 101. At block 307, the mapped control command is executed at the vehicle entertainment unit 101 to perform the function corresponding to the issued control command issued by the center stack control system 100.

According to an exemplary embodiment of the present invention, the process described above with reference to FIG. 3 is implemented using AVRCP. For example, AVRCP is utilized when transmitting the control command from the center stack control system 100 to the vehicle entertainment unit 101. Further, providing the user with the ability to change media input sources, and to view, browse, select and manipulate media content at the vehicle entertainment unit 101 using the center stack control system 100 is implemented using AVRCP.

Figure 4:
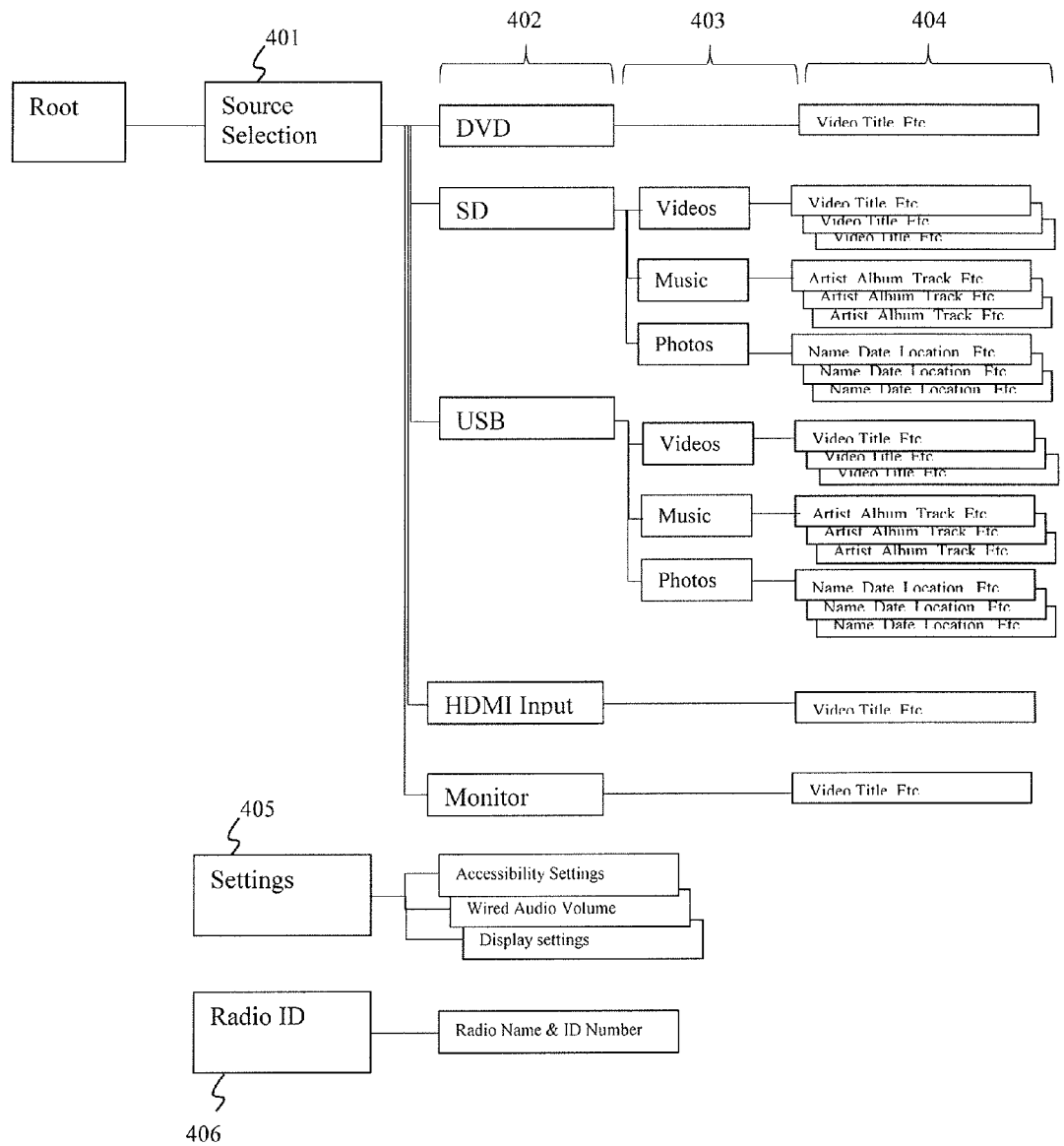
FIG. 4 shows an example of a virtual menu system that may be utilized when mapping data between a center stack control system and a vehicle entertainment unit according to an exemplary embodiment of the present invention.

FIG. 4 shows an example of a virtual menu system that may be utilized when mapping data (e.g., metadata and control commands) between the center stack control system 100 and the vehicle entertainment unit 101 as described above, according to an exemplary embodiment of the present invention. For example, AVRCP may be utilized to implement a virtual menu system having a folder and metadata structure that represents the control menu of the vehicle entertainment unit 101, allowing the user to use the center stack control system 100 to select and control media data provided by the vehicle entertainment unit 101.

For example, in FIG. 4, a Source Selection virtual folder 401 links to a plurality of virtual subfolders 402 corresponding to the different media sources available in the vehicle entertainment unit 101 (e.g., a DVD player, an SD card slot, a USB interface, an HDMI interface, and an additional monitor connected to the vehicle entertainment unit 101). The virtual subfolders 402 link to another plurality of virtual subfolders 403 corresponding to different types of media data 403 respectively available to each media source. The virtual subfolders 403 link to another plurality of virtual subfolders corresponding to metadata 404 including information relating to the respective media data. Additional virtual folders 405 and 406 may be utilized to respectively provide the user with access to settings of the vehicle entertainment unit 101 (e.g., virtual folder 405) and to information about the vehicle entertainment unit (e.g., virtual folder 406). It is to be understood that utilization of the virtual menu system as shown in FIG. 4 is exemplary, and exemplary embodiments of the present invention are not limited thereto.

Referring to FIGS. 3 and 4, in an exemplary embodiment, the control commands issued by the center stack control system 100 (see block 304) are mapped to the appropriate virtual folders at the vehicle entertainment unit 101 (see block 306) using AVRCP via the BLUETOOTH connection between the center stack control system 100 and the vehicle entertainment unit 101, allowing the user to control the vehicle entertainment unit 101 using the center stack control system 100. For example, the user may switch between media sources, may browse media content, and may control media content by issuing control commands via the center stack control system 100 that are mapped to the virtual folders shown in FIG. 4.

The vehicle entertainment unit 101 (and the wireless conversion control unit 501 described below) is treated by the center stack control system 100 as a standard BLUETOOTH device. The user initially establishes a BLUETOOTH connection between the center stack control system 100 and the vehicle entertainment unit 101 using a BLUETOOTH pairing process normally performed to pair BLUETOOTH devices. The vehicle entertainment unit 101 may be paired to the center stack control system 100 at the same time as additional BLUETOOTH devices such as, for example, a smartphone, allowing the user to both use the center stack control system 100 to control the vehicle entertainment unit 101 and to simultaneously listen to audio, make phone calls, etc. using the smartphone. According to exemplary embodiments, although the center stack control system 100 is paired to the vehicle entertainment unit 101 to control the vehicle entertainment unit 101, media data from the vehicle entertainment unit 101 (e.g., audio and video data) is not played back through the center stack control system 100 or the vehicle's built-in stereo system. Rather, media playback is limited to the vehicle entertainment unit 101 (e.g., video playback is limited to the vehicle entertainment unit's 101 display screen and audio playback is limited to the vehicle entertainment unit's 101 speaker(s)).

In an exemplary embodiment, the vehicle entertainment unit 101 may still be controlled via its own input controls while the unit 101 is also being controlled via the center stack control system 100. Alternatively, the center stack control system 100 may implement a locked mode (e.g., a child lock mode) in which all input controls on the vehicle entertainment unit 101 (including, for example, input controls on a remote control of the vehicle entertainment unit 101) are disabled while the unit 101 is being controlled by the center stack control system 100.

Some center stack control systems 100 allow for the installation of third party software applications by the user. In exemplary embodiments, software compatible with the vehicle entertainment unit 101 may be provided to provide the user with additional functionality.

Figure 5:
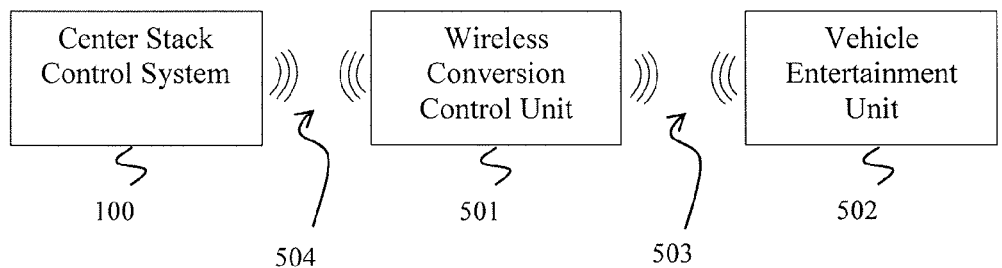
FIG. 5 shows an overview of a system in which a vehicle entertainment unit is controlled using a vehicle's center stack control system and a wireless conversion control unit according to an exemplary embodiment of the present invention.

FIG. 5 shows an overview of a system in which a vehicle entertainment unit is controlled using a vehicle's center stack control system and a wireless conversion control unit according to an exemplary embodiment of the present invention.

According to an exemplary embodiment of the present invention, a wireless conversion control unit 501 may be utilized to allow a vehicle entertainment unit 502 that does not include a BLUETOOTH transceiver and does not have AVRCP capabilities to communicate with and be controlled by a center stack control system 100 that includes a BLUETOOTH transceiver and has AVRCP capabilities. The vehicle entertainment unit 502 may be mounted and disposed in a vehicle in the same manner as the vehicle entertainment unit 101 described above.

The wireless conversion control unit 501 connects to the vehicle entertainment unit 502 via, for example, a wireless infrared (IR) connection 503 implemented using an IR transmitter disposed in the wireless conversion control unit 501. In exemplary embodiments, this connection may also be established, for example, via other wireless connection types or via a wired connection. The wireless conversion control unit 501 further connects to the center stack control system 100 via a wireless connection such as, for example, a BLUETOOTH connection 504 that supports AVRCP.

Once the wireless conversion control unit 501 has established a connection to both the center stack control system 100 and the vehicle entertainment unit 502, the wireless conversion control unit 501 may facilitate communication between the center stack control system 100 and the vehicle entertainment unit 502 by allowing data (e.g., control commands and metadata, as described above) to be transmitted and received between the center stack control system 100 and the vehicle entertainment unit 502 through the wireless conversion control unit 501.

Figure 6:
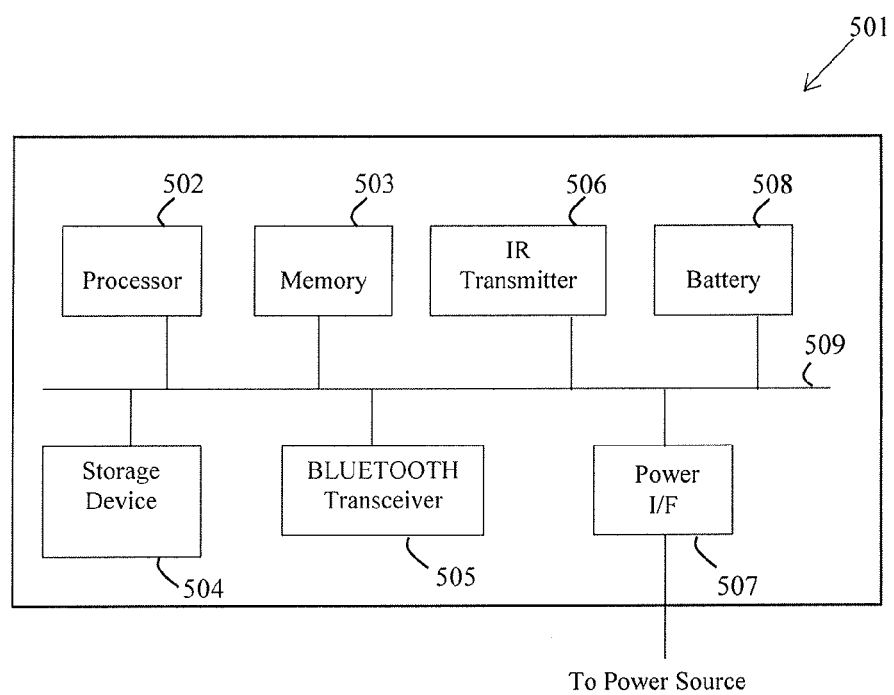
FIG. 6 is a block diagram showing a wireless conversion control unit according to an exemplary embodiment of the present invention.

FIG. 6 is a block diagram showing the wireless conversion control unit according to an exemplary embodiment of the present invention.

The wireless conversion control unit 501 may include, for example, a processor 502, a memory 503, a storage device 504, a wireless transceiver (e.g., a BLUETOOTH transceiver) 505, the IR transmitter 506, a power interface 507 (e.g., a 12V connection port to receive power from the vehicle), and a battery 508 (e.g., for receiving power in addition to, or in the absence of, a connection to the vehicle power source). The components of the wireless conversion control unit 501 communicate with each other via a bus(es) 509. It is to be understood that the wireless conversion control unit 501 may include some or all of the components described with reference to FIG. 6, and may further include additional components.

The wireless conversion control unit 501 may receive control commands from the center stack control system 100 in a manner similar to the vehicle entertainment unit 101 receiving such control commands as described above. The control commands may be, for example, standard AVRCP commands. As the wireless conversion control unit 501 receives commands from the center stack control system 100, the wireless conversion control unit 501 translates/maps these commands into a format that is decipherable by the vehicle entertainment unit 502, thus, allowing the vehicle entertainment unit 502 to be controlled wirelessly via the center stack control system 100 in a manner similar to that described above with reference to FIGS. 1 to 4.

According to exemplary embodiments of the present invention described herein, a vehicle entertainment unit is provided that is capable of being controlled by a standard production radio control unit (e.g., a factory/stock center stack control system) without the need for custom wiring and/or custom software installed on the standard production radio control unit. For example, exemplary embodiments use AVRCP to allow for the selection and control of media data on a vehicle entertainment unit without the use of wires, dedicated network connections, or custom software installed on the center stack control system.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A vehicle entertainment unit, comprising:
   a wireless transceiver configured to establish a wireless connection between the vehicle entertainment unit and a center stack control system of a vehicle, wherein the center stack control system controls an audio system of the vehicle, a heating and cooling system of the vehicle, a navigation system of the vehicle, a seat adjustment system of the vehicle, and a mirror adjustment system of the vehicle;

an optical disc drive configured to play first media content at the vehicle entertainment unit;

a portable storage device interface configured to receive a removable portable storage device and play second media content at the vehicle entertainment unit; and a processor configured to:
- retrieve metadata from the vehicle entertainment unit, wherein the retrieved metadata is transmitted from the vehicle entertainment unit to the center stack control system by the wireless transceiver via the wireless connection,
- wherein the wireless transceiver is configured to receive a control command via the wireless connection from the center stack control system in response to a user interacting with visual content, via a touchscreen interface of the center stack control system, corresponding to the metadata at the center stack control system;
- map the control command to a corresponding function of the vehicle entertainment unit; and
- execute the corresponding function at the vehicle entertainment unit,
- wherein the corresponding function executed at the vehicle entertainment unit comprises selecting one of the first media content and the second media content for playback at the vehicle entertainment unit, wherein at least one of the first media content and the second media content comprises video data, wherein the vehicle entertainment unit is configured to be mounted in the vehicle.

\* \* \* \* \*